United States Patent
Ikeda

(10) Patent No.: US 7,710,467 B2
(45) Date of Patent: May 4, 2010

(54) IMAGE PROCESSING APPARATUS AND CONTROL METHOD, COMPUTER PROGRAM, AND RECORDING MEDIUM STORING A PROGRAM DETERMINING OR IDENTIFYING WHETHER DATE INFORMATION IS ADDED TO AN IMAGE

(75) Inventor: Hitoshi Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 913 days.

(21) Appl. No.: 11/044,256

(22) Filed: Jan. 28, 2005

(65) Prior Publication Data

US 2005/0174597 A1   Aug. 11, 2005

(30) Foreign Application Priority Data

Feb. 6, 2004   (JP)   .............................. 2004-031400

(51) Int. Cl.
*H04N 5/76* (2006.01)
*H04N 5/222* (2006.01)

(52) U.S. Cl. .............................. 348/231.5; 348/333.02; 348/333.12

(58) Field of Classification Search .............. 348/207.2, 348/231.99, 231.3, 231.5
See application file for complete search history.

(56) References Cited

U.S. PATENT DOCUMENTS

| | | | | |
|---|---|---|---|---|
| 5,633,678 A | * | 5/1997 | Parulski et al. ............ | 348/231.5 |
| 6,075,949 A | * | 6/2000 | Hatakenaka et al. ........ | 396/301 |
| 6,275,260 B1 | * | 8/2001 | Anderson .................... | 348/239 |
| 6,351,321 B1 | * | 2/2002 | McIntyre et al. ............ | 358/450 |
| 6,473,153 B2 | * | 10/2002 | Iguchi et al. .................. | 355/40 |
| 6,512,856 B1 | * | 1/2003 | Davis .......................... | 382/284 |
| 6,552,821 B2 | * | 4/2003 | Suzuki ......................... | 358/1.9 |
| 6,563,542 B1 | * | 5/2003 | Hatakenaka et al. ... | 348/333.02 |

(Continued)

FOREIGN PATENT DOCUMENTS

JP   09133976 A   *   5/1997

(Continued)

OTHER PUBLICATIONS

Japanese Office Action issued May 30, 2008, in Japanese Application No. 2004-031400.

(Continued)

*Primary Examiner*—Ngoc-Yen T Vu
(74) *Attorney, Agent, or Firm*—Fitzpatrick, Cella, Harper & Scinto

(57) ABSTRACT

An image processing apparatus which is connected to a printer apparatus and controls the printer apparatus to print a shot image, includes an image sensing unit for shooting an image, a setting reception unit for receiving settings as to whether or not date information of shooting is to be added to the image shot by the image sensing unit, an addition unit for adding the date information to the image shot by the image sensing unit on the basis of the received settings, an identifier generation unit for generating an identifier, which is used to identify whether or not the date information is added to the shot image and to limit a printing condition of the printer apparatus, on the basis of the received settings, and appending the identifier to a header of the shot image, and a transmission unit for transmitting the image having the header appended with the identifier to the printer apparatus.

8 Claims, 14 Drawing Sheets

U.S. PATENT DOCUMENTS

| | | | |
|---|---|---|---|
| 6,618,553 B1 | 9/2003 | Shiohara | 386/117 |
| 6,956,671 B2 * | 10/2005 | Monty et al. | 358/1.9 |
| 7,014,374 B2 * | 3/2006 | Hamaguchi et al. | 400/62 |
| 7,019,779 B1 * | 3/2006 | Suzuki | 348/333.02 |
| 7,161,701 B2 * | 1/2007 | Ogiwara et al. | 358/1.15 |
| 2002/0051201 A1 * | 5/2002 | Winter et al. | 358/1.16 |
| 2005/0259154 A1 * | 11/2005 | Umeyama | 348/207.2 |

FOREIGN PATENT DOCUMENTS

| | | |
|---|---|---|
| JP | 11-46331 | 2/1999 |
| JP | 2000-190579 | 7/2000 |
| JP | 2002016789 A * | 1/2002 |
| JP | 2002-314931 * | 10/2002 |
| JP | 2002-368977 * | 12/2002 |
| JP | 2003-246119 | 9/2003 |

OTHER PUBLICATIONS

Japanese Office Action issued Aug. 15, 2008, in Japanese Application No. 2004-031400.

* cited by examiner

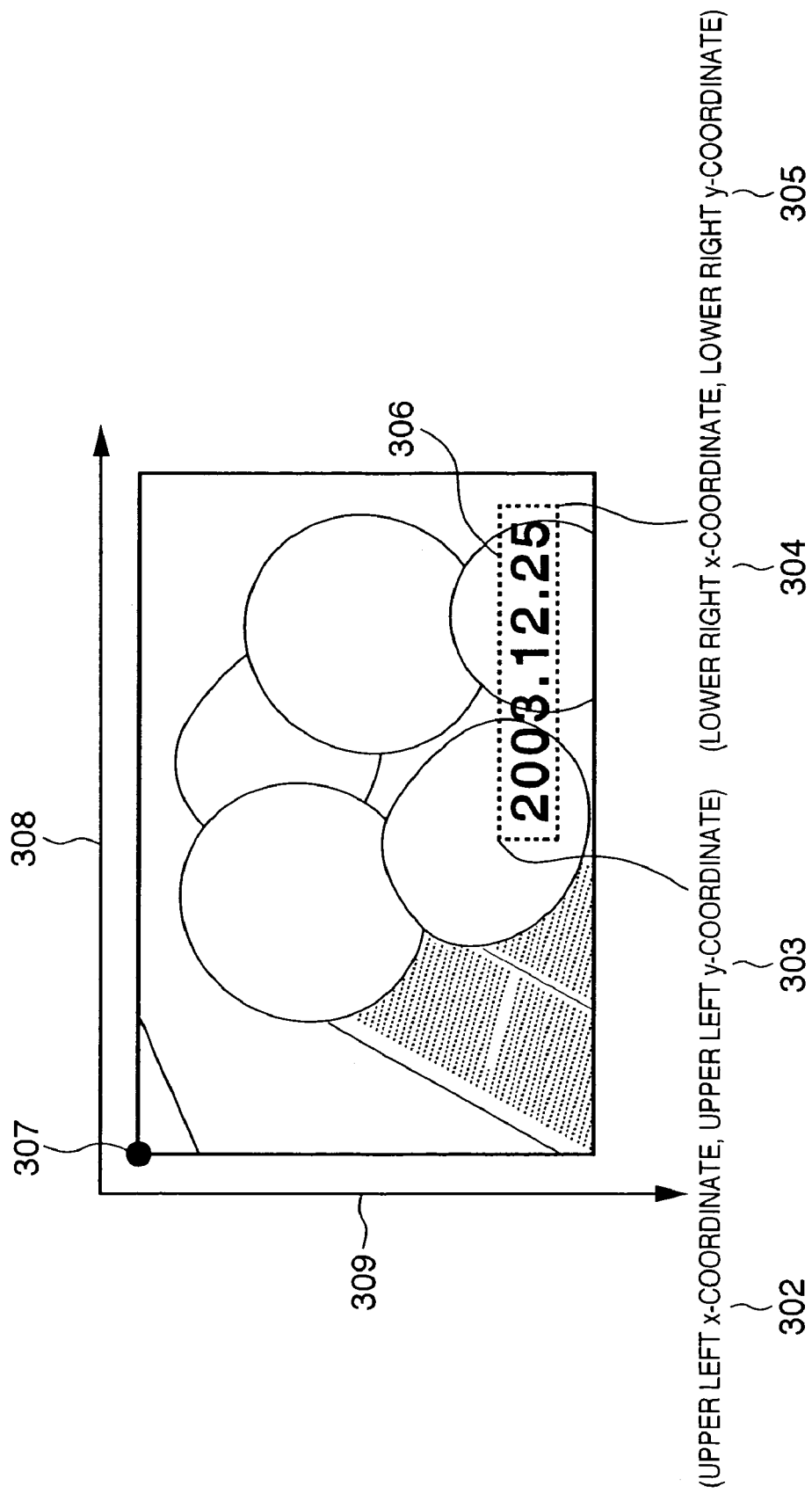

IMAGE PROCESSING APPARATUS AND CONTROL METHOD, COMPUTER PROGRAM, AND RECORDING MEDIUM STORING A PROGRAM DETERMINING OR IDENTIFYING WHETHER DATE INFORMATION IS ADDED TO AN IMAGE

FOREIGN PRIORITY

This application claims priority from Japanese Patent Application No. 2004-031400 filed on Feb. 6, 2004, which is hereby incorporated by reference herein.

FIELD OF THE INVENTION

The present invention relates to an image processing apparatus which can prevent from printing both a date added to an image and a date to be appended by a printer apparatus upon printing an image.

BACKGROUND OF THE INVENTION

Conventionally, in a system where an image sensing apparatus such as a digital still camera, digital video camera, or the like is connected to a printer apparatus via a communication cable or wireless channel or is integrated with it, image information shot by the image sensing apparatus can be printed without going through any information processing apparatus such as a computer or the like for processing image information.

Such image sensing apparatus, which can print shot image information by connecting the printer apparatus, allows the selection of images to be printed and to make print settings such as a paper setting, a date stamp setting, setting of the number of copies, and the like from the image sensing apparatus itself. When the date stamp setting is set ON at the image sensing apparatus side, the printer apparatus can append a shooting date on a recording medium.

Also, the image sensing apparatus itself can directly add a shooting date as image information to an image, and record it on a recording medium.

However, when such a date-added image shot by the digital still camera is printed by connecting the printer apparatus like in the prior art, since the shooting date is already added to the image as image information at the camera side, if the printer apparatus prints a shooting date based on the date stamp setting, the date added to the image by the digital still camera itself and the date to be appended by the printer apparatus are doubly printed.

That is, the present invention has as its object to prevent the double printing of date information upon printing a shot image.

SUMMARY OF THE INVENTION

According to the present invention that can solve the above problems, an image processing apparatus which is connected to a printer apparatus and controls the printer apparatus to print a shot image, comprises: an image sensing unit for shooting an image; a setting reception unit for receiving settings as to whether or not date information of shooting is to be added to the image shot by the image sensing unit; an addition unit for adding the date information to the image shot by the image sensing unit on the basis of the received settings; an identifier generation unit for generating an identifier, which is used to identify whether or not the date information is added to the shot image and to limit a printing condition of the printer apparatus, on the basis of the received settings, and appending the identifier to a header of the shot image; and a transmission unit for transmitting the image having the header appended with the identifier to the printer apparatus.

According to the present invention that can further solve the above problems, an image processing apparatus which can print a shot image, comprises: an image sensing unit for shooting an image; a setting reception unit for receiving settings as to whether or not date information of shooting is to be added to the image shot by the image sensing unit; an addition unit for adding the date information to the image shot by the image sensing unit on the basis of the received settings; an identifier generation unit for generating an identifier, which is used to identify whether or not the date information is added to the shot image and to limit a printing condition of the printer apparatus, on the basis of the received settings, and appending the identifier to a header of the shot image; and a printing unit for printing the image having the header appended with the identifier.

According to the present invention that can further solve the above problems, a printer apparatus which can print an image, comprises: a determination unit for determining if date information of shooting of the image is added to the image; a print condition setting unit for, when the determination unit determines that the date information is added to the image, setting a printing condition where addition of the date information to the image is inhibited in the printer apparatus; and a printing unit for printing the image on the basis of the set printing condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7B shows an example of the coordinate position of date information added to image data according to the embodiment of the present invention;

DETAILED DESCRIPTION OF THE PREFERRED EMBODIMENTS

Preferred embodiments of the present invention will now be described in detail in accordance with the accompanying drawings.

Figure 1A:
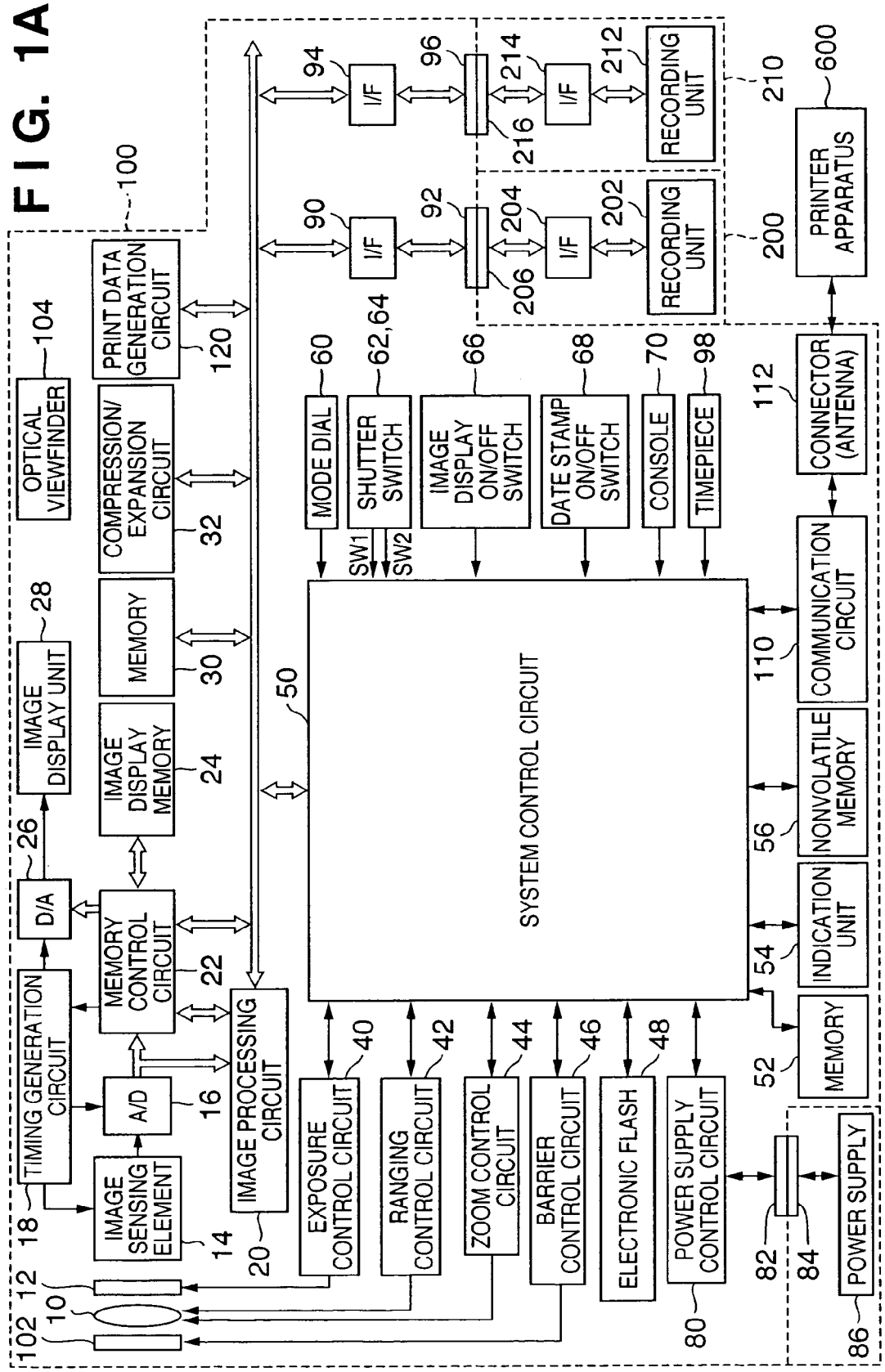
FIG. 1A is a block diagram showing an example of the arrangement of an image processing apparatus according to an embodiment of the present invention.

FIG. 1A is a block diagram showing the arrangement according to an embodiment of the present invention. Referring to FIG. 1A, reference numeral 100 denotes an image processing apparatus. Reference numeral 10 denotes a shooting lens; reference numeral 12 denotes a shutter with a stop function; reference numeral 14 denotes an image sensing element for converting an optical image into an electrical signal; and reference numeral 16 denotes an A/D converter for converting an analog signal output of the image sensing element 14 into a digital signal.

Reference numeral 18 denotes a timing generation circuit for supplying clock signals and control signals to the image sensing element 14, the A/D converter 16, and a D/A converter 26. The timing generation circuit 18 is controlled by a memory control circuit 22 and system control circuit 50.

Reference numeral 20 denotes an image processing circuit which applies a predetermined pixel interpolation process and color conversion process to data from the A/D converter 16 or data from the memory control circuit 22. Furthermore, the image processing circuit 20 can add a date to an image by executing a date image addition process.

The image processing circuit 20 applies predetermined arithmetic processes using sensed image data, and the system control circuit 50 executes a TTL (through-the-lens) AF (auto-focus) process, AE (auto-exposure), an AWB (auto-white balance) process, and an EF (flash pre-emission) process, which control an exposure control circuit 40 and ranging control circuit 42, on the basis of the obtained arithmetic result.

Reference numeral 22 denotes a memory control circuit, which controls the A/D converter 16, the timing generation circuit 18, the image processing circuit 20, an image display memory 24, the D/A converter 26, a memory 30, and a compression/expansion circuit 32.

Data from the A/D converter 16 is written in the image memory 24 or memory 30 via the image processing circuit 20 and memory control circuit 22 or directly through the memory control circuit 22.

Reference numeral 24 denotes an image display memory; reference numeral 26 denotes a D/A converter; and reference numeral 28 denotes an image display unit which comprises a TFT LCD or the like. Display image data written in the image display memory 24 is displayed on the image display unit 28 via the D/A converter 26. When the sensed image data are sequentially displayed using the image display unit 28, an electronic viewfinder function can be implemented.

The image display unit 28 can arbitrarily turn on/off its display function in accordance with an instruction from the system control circuit 50. When the display function of the image display unit 28 is turned off, the consumption power of the image processing apparatus 100 can be greatly saved.

Reference numeral 30 denotes a memory for storing still images and moving images. The memory 30 has a sufficiently large memory size that can store a predetermined number of still images and a moving image for a predetermined period of time. As a result, in case of continuous-shot shooting or panorama shooting that continuously photograph a plurality of still images, write access of a large number of images can be made on the memory 30 at high speed. In addition, the memory 30 can be used as a work area of the system control circuit 50.

Reference numeral 32 denotes a compression/expansion circuit which compresses/expands image data by adaptive discrete cosine transformation (ADCT) or the like. The compression/expansion circuit 32 executes a compression or expansion process by loading an image stored in the memory 30, and writes the processed data in the memory 30.

Reference numeral 40 denotes an exposure control circuit that controls the shutter 12 with a stop function. The exposure control circuit 40 also has a flash light control function in collaboration with an electronic flash 48. Reference numeral 42 denotes a ranging control circuit that controls focusing of the shooting lens 10; reference numeral 44 denotes a zoom control circuit for controlling zooming of the shooting lens 10; and reference numeral 46 denotes a barrier control circuit for controlling the operation of a protection unit 102 as a barrier.

Reference numeral 48 denotes an electronic flash which also has a light projection function of AF auxiliary light, and the flash light control function. The exposure control circuit 40 and ranging control circuit 42 are controlled using the TTL system, and the system control circuit 50 controls the exposure control circuit 40 and ranging control circuit 42 on the basis of the arithmetic result of sensed image data by the image processing circuit 20.

Reference numeral 50 denotes a system control circuit for controlling the overall image processing apparatus 100; and reference numeral 52 denotes a memory for storing constants, variables, programs, and the like required to operate the system control circuit 50. Reference numeral 54 denotes an indication unit, which includes a liquid crystal display device, loudspeaker, and the like, and indicates operation states, messages, and the like using text, icons, sound, and the like in accordance with execution of programs by the system control circuit 50. The indication unit 54 is set at one or a plurality of easy-to-see positions around the console of the image processing apparatus 100, and is constructed by a combination of an LCD, LEDs, sound generation element, and the like. Some functions of the indication unit 54 are set within an optical viewfinder 104.

Of the indication contents of the indication unit 54, those displayed on the LCD or the like include, e.g., a single/continuous shot indication, a self timer indication, a compression ratio indication, a recording pixel count indication, a recorded image count indication, a remaining recordable image count indication, a shutter speed indication, an aperture value indication, an exposure correction indication, a flash indication, a red-eye suppression indication, a macro shooting indication, a buzzer setting indication, a remaining timepiece battery capacity indication, a remaining battery capacity indication, an error indication, an information indication using numerals of a plurality of digits, an attachment/detachment indication of recording media 200 and 210, a communication I/F operation indication, a date/time indication, and the like. Of the indication contents of the indication unit 54, those displayed within the optical viewfinder 104 include, e.g., an in-focus indication, a camera shake alert indication, a flash charging indication, a shutter speed indication, an aperture value indication, an exposure correction indication, and the like.

Reference numeral 56 denotes an electrically erasable/programmable nonvolatile memory, which uses, e.g., an EEPROM or the like. Reference numerals 60, 62, 64, 66, 68, and 70 denote operation units for inputting various operation instructions of a system control circuit 118. These operation units are constructed by one or a plurality of combinations of a switch, a dial, a touch panel, a pointer using line of sight detection, a voice recognition device, and the like.

Examples of these operation units will be explained below. Reference numeral 60 denotes a mode dial switch which can selectively set one of various function modes: power OFF, an automatic shooting mode, a shooting mode, a panorama shooting mode, a playback mode, a multi-frame playback/erasure mode, a PC connection mode, and the like.

Reference numeral 62 denotes a shutter switch SW1, which is turned on at the middle of operation of a shutter button (not shown), and instructs to start the AF (auto-focus) process, the AE (auto-exposure) process, the AWB (auto-white balance) process, the EF (flash pre-emission) process, and the like.

Reference numeral 64 denotes a shutter switch SW2, which is turned on upon completion of operation of the shutter button (not shown), and instructs to start a series of processes including an exposure process for writing a signal read out from the image sensing element 14 as image data in the memory 30 via the A/D converter 16 and memory control circuit 22, a development process and date addition process using arithmetic results in the image processing circuit 20 and memory control circuit 22, and a recording process for reading out image data from the memory 30, compressing the readout data by the compression/expansion circuit 32, and writing the compressed image data in the recording medium 200 or 210.

Reference numeral 66 denotes an image display ON/OFF switch which can set the ON/OFF state of the image display unit 28. With this function, when current supply to the image display unit comprising the TFT LCD and the like is cut off upon shooting using the optical viewfinder 104, power savings can be attained.

Reference numeral 68 denotes a date stamp ON/OFF switch which can set a function of stamping or adding a date to shot image data in the shooting mode. If this switch 68 is "ON", a setting for adding a date to image data is selected; otherwise, a setting that does not add any date to image data is selected.

Reference numeral 70 denotes a console including various buttons, a touch panel, and the like, which include a menu button, a set button, a macro button, a multi-frame playback new page button, a flash setting button, a single-shot/continuous-shot/self-timer select button, a menu move + (plus) button, a menu move − (minus) button, a playback image move + (plus) button, a playback image move − (minus) button, a shooting image quality select button, an exposure correct button, a date/time setting button, and the like.

Reference numeral 80 denotes a power supply control circuit which is comprised of a battery detection circuit, a DC-DC converter, a switch circuit for switching blocks to be energized, and the like. The power supply control circuit 80 detects the presence/absence, type, and remaining battery amount of a battery attached, controls the DC-DC converter on the basis of such detection results and an instruction from the system control circuit 50, and supplies a required voltage to the respective units including the recording media for a required period of time.

Reference numerals 82 and 84 denote connectors; and reference numeral 86 denotes a power supply circuit. The power supply circuit 86 includes a primary battery such as an alkali battery, lithium battery, or the like, a secondary battery such as an NiCd battery, NiMH battery, Li battery, or the like, an AC adapter, and the like.

Reference numerals 90 and 94 denote interfaces with recording media such as a memory card, hard disk, and the like; and reference numerals 92 and 96 denote connectors for connecting recording media such as a memory card, hard disk, and the like.

Note that this embodiment has two sets of interfaces and connectors that receive the recording media. However, the number of sets of interfaces and connectors that receive the recording media is not particularly limited. Also, combinations of interfaces and connectors of different standards may be used. As the interface and connector, those complying with the standards of a PCMCIA card, a CF (Compact Flash®) card, and the like may be used.

Furthermore, when the interfaces 90 and 94, and connectors 92 and 96 use those complying with the standards of a PCMCIA card, a CF (Compact Flash®) card, and the like, and various communication cards such as a LAN card, a modem card, a USB card, an IEEE1394 card, a P1284 card, a SCSI card, a PHS, and the like are connected thereto, image data and associated management information can be transferred between the image processing apparatus and another computer or its peripheral devices such as a printer and the like.

Reference numeral 98 denotes a timepiece which keeps working by an internal power supply (not shown), and is used to, e.g., acquire a shooting date to be recorded in a header of an image upon shooting. Reference numeral 102 denotes a protection unit as a barrier which covers an image sensing unit including the lens 10 of the image processing apparatus 100 to prevent contamination and damages of the image sensing unit.

Reference numeral 104 denotes an optical viewfinder. Shooting can be done using the optical viewfinder 104 alone without using the electronic viewfinder function implemented by the image display unit 28. In the optical viewfinder 104, some functions of the indication unit 54, e.g., an in-focus indication, a camera shake alert indication, a flash charging indication, a shutter speed indication, an aperture value indication, an exposure correction indication, and the like are provided.

Reference numeral 110 denotes a communication circuit having various communication functions such as RS232C, USB, IEEE1394, P1284, SCSI, modem, LAN, radio communication, and the like. When the image processing apparatus 100 and a printer apparatus 600 are connected via a dedicated cable and communications are made via the communication circuit, an image can be printed by operating the control 70.

Reference numeral 112 denotes a connector or antenna, which serves as a connector when the image processing apparatus 100 is connected to another apparatus such as the printer apparatus 600 or the like using the communication circuit 110, or serves as an antenna in case of wireless communications. Reference numeral 120 denotes a print data generation circuit for generating print data to be transmitted to the printer apparatus 600 when an image is to be printed by connecting the image processing apparatus 100 and printer apparatus 600. The generated print data is transmitted to the printer apparatus 600 via the communication circuit 110, and undergoes a print process.

Reference numeral 200 denotes a recording medium such as a memory card, a hard disk, or the like. The recording medium 200 comprises a recording unit 202 comprised of a semiconductor memory, a magnetic disk, or the like, an interface 204 with the image processing apparatus 100, and a connector 206 for connecting the image processing apparatus 100.

Reference numeral 210 denotes a recording medium such as a memory card, a hard disk, or the like. The recording medium 210 comprises a recording unit 212 comprised of a semiconductor memory, a magnetic disk, or the like, an interface 214 with the image processing apparatus 100, and a connector 216 for connecting the image processing apparatus 100.

Figure 1B:
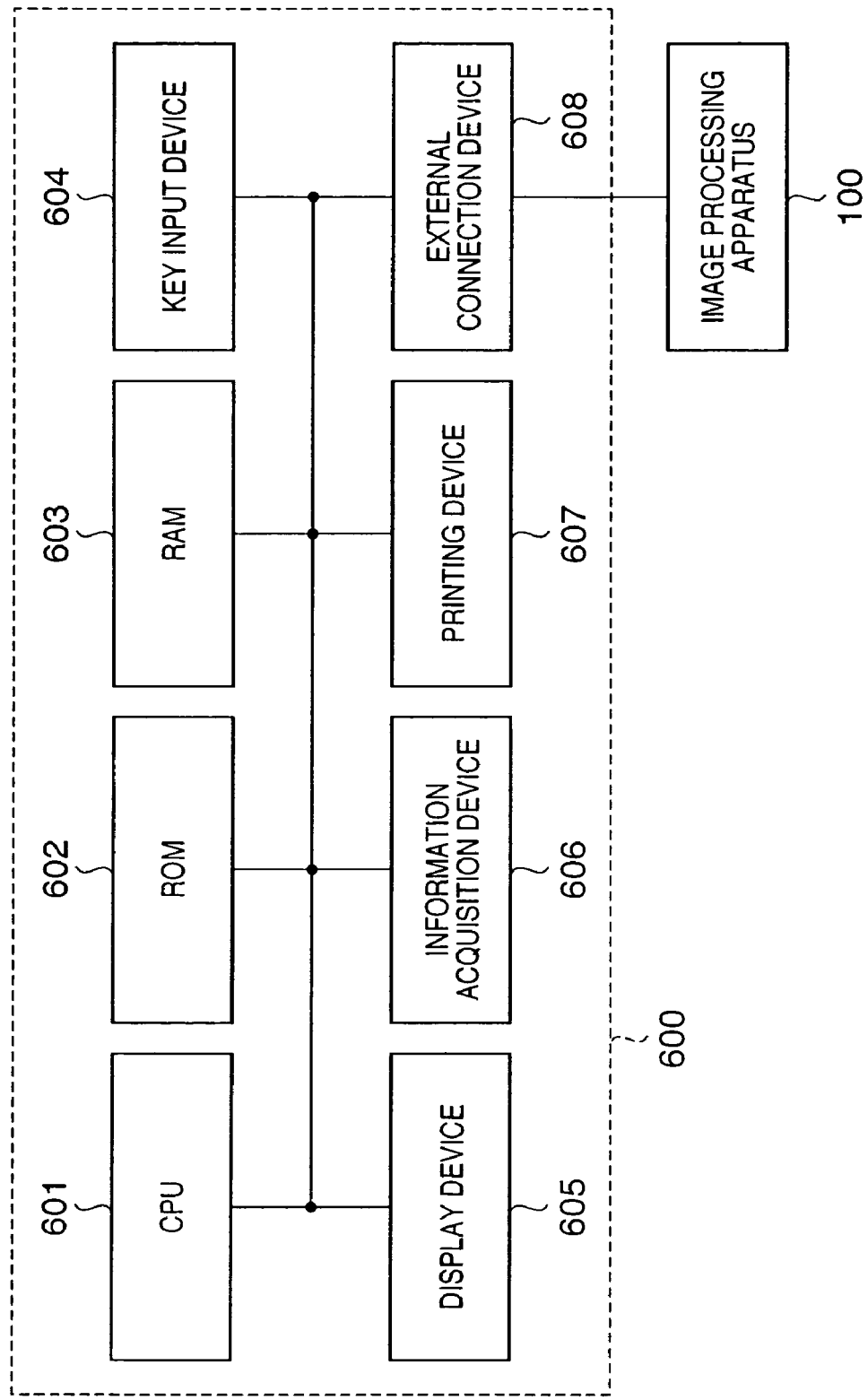
FIG. 1B is a block diagram showing an example of the arrangement of a printer apparatus according to the embodiment of the present invention.

The printer apparatus 600 according to this embodiment comprises a CPU 601, a ROM 602, a RAM 603, a key input device 604, a display device 605, an information acquisition device 607, a printing device 608, and an external connection device 609, as shown in FIG. 1B.

In the above arrangement, the CPU 601 executes various programs stored in the ROM 602, and executes a process that writes data in the RAM 603 and refers to the written data as needed.

The ROM 602 is a programmable, nonvolatile memory and stores programs required to control the aforementioned devices, and programs and data required to execute data processes. The RAM 603 undergoes data write access and reference access as needed upon execution of the programs stored in the ROM 603. The key input device 604 is used to input execution instructions that prompt the printer apparatus 600 to execute various functions, and the processes are executed based on these input instructions.

The display device 605 performs a display process of display data stored in a display memory of the RAM 603. The display device 605 executes a confirmation process of execution functions for displaying the function name of a function to be confirmed and a print preview display process for displaying a print preview, and also displays necessary information. The information acquisition device 606 is a device used to read information stored in information acquisition media (e.g., recording media such as a Compact Flash®, Smartmedia, and the like), and can acquire image data sensed by the image processing apparatus 100 and the like from that information acquisition media. The information acquisition device 606 may be incorporated in the printer apparatus or may be connected via a wired or wireless communication.

The printing device 607 performs a printing process using inks stored in attached cartridges and a paper sheet when a print execution instruction is issued by the image processing apparatus 100.

The external connection device 608 is used when the printer apparatus 600 is connected to the image processing apparatus 100 via a wired or wireless communication, and data is exchanged with the image processing apparatus 100 via this external connection device 608.

Figure 2:
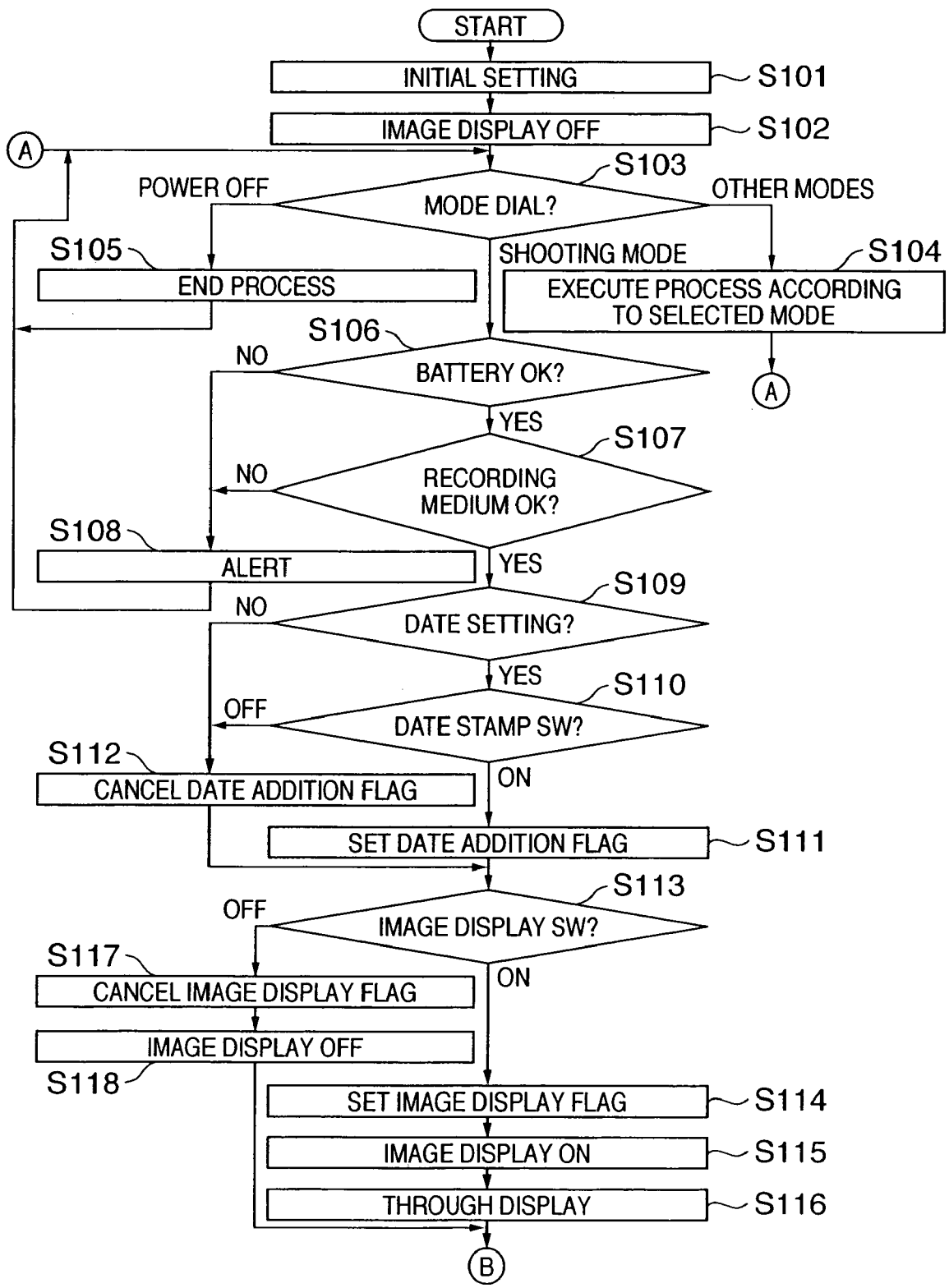
FIG. 2 is a flowchart showing an example of activation and shooting operations in an image processing apparatus 100 according to the embodiment of the present invention.
Figure 3:
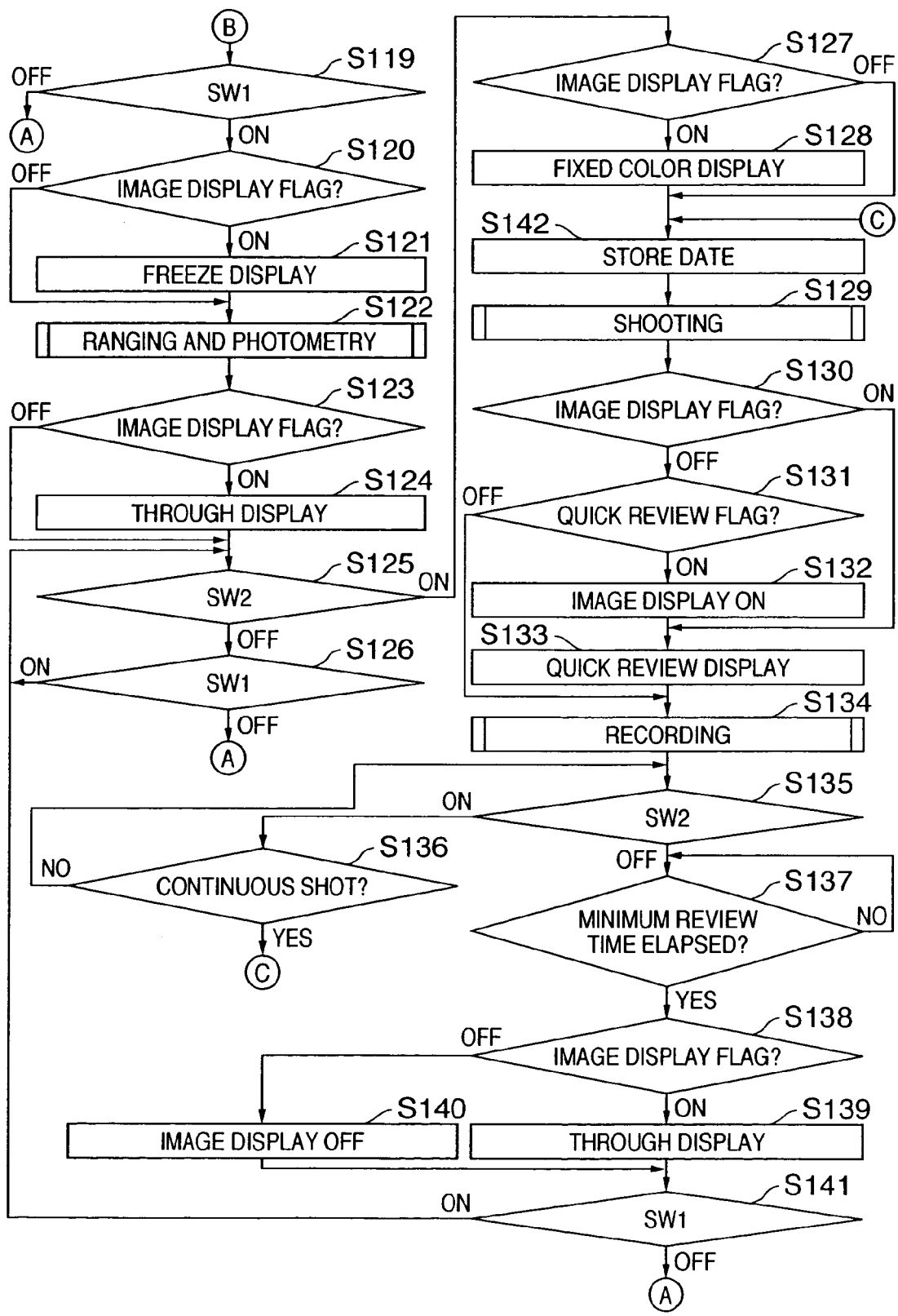
FIG. 3 is a flowchart showing an example of the activation and shooting operations in the image processing apparatus 100 according to the embodiment of the present invention.

The activation and shooting operations of the image processing apparatus 100 according to this embodiment will be described below with reference to FIGS. 2 to 6. FIGS. 2 and 3 are flowcharts of a routine of activation and shooting of the image processing apparatus 100 according to this embodiment.

Upon power ON after battery exchange or the like, the system control circuit 50 initializes flags, control variables, and the like (S101), and also initializes the image display function of the image display unit 28 to an OFF state (S102).

The system control circuit 50 checks the setting position of the mode dial 60. If the mode dial 60 is set at the "power OFF" position (S103), the system control circuit 50 executes a predetermined end process, which changes indications of respective indication units to an end state, closes the barrier of the protection unit 102 to protect the image sensing unit, records required parameters, setting values, and a setting mode including flags, control variables, and the like in the nonvolatile memory 56, cuts off unnecessary power supplies to respective units of the image processing apparatus 100 including the image display unit 28 by the power supply control circuit 80, and so forth (S105). After that, the flow returns to step S103.

If the mode dial 60 is set at the "shooting mode" position ("shooting mode" in S103), the flow advances to step S106. If the mode dial 60 is set at any of other mode positions ("other modes" in S103), the system control circuit 50 executes a process according to the selected mode (S104). Upon completion of the process, the flow returns to step S103.

The system control circuit 50 checks using the power supply control circuit 80 if the remaining capacity and operation state of the power supply 86 comprising batteries and the like pose any problem in the operation of the image processing apparatus 100 (S106). If any problem is found, a predetermined visual or audible alert indication is made using the indication unit 54 (S108), and the flow then returns to step S103.

If no problem is found in the power supply 86 ("YES" in S106), the system control circuit 50 checks if the operation state of the recording medium 200 or 210 poses any problem in the operation of the image processing apparatus 100, in particular, recording/playback of image data to/from the recording medium 200 or 210 (S107). If any problem is found ("NO" in step S107), a predetermined visual or audible alert indication is made using the indication unit 54 (S108), and the flow then returns to step S103.

If no problem is found in the operation state of the recording medium 200 or 210 (S107), the flow advances to step S109.

If no date setting is made ("NO" in S109), since a date addition process is disabled, a date addition flag is canceled (S112). If a date setting is made ("YES" in S109), the system control circuit 50 checks the setting state of the date stamp ON/OFF switch 68 (S110). If date stamp=ON, the circuit 50 sets the date addition flag (S111); if date stamp=OFF, it cancels the date addition flag (S112). Note that the status of the date addition flag is stored in the internal memory of the system control circuit 50 or the memory 52.

Note that the date addition flag is an identifier used to identify whether or not date information is added to an image shot in a shooting process (S129) and whether or not information associated with date information added to the image is appended to a header of the image in a recording process (S134).

The system control circuit 50 checks the setting state of the image display ON/OFF switch 66 (S113). If image display=ON, the circuit 50 sets an image display flag (S114), sets the image display function of the image display unit 28 to an ON state (S115), and also sets it in a through display state that sequentially displays sensed image data (S116). The flow then advances to step S119.

In the through display state, data which are sequentially written in the image display memory 24 via the image sensing element 14, A/D converter 16, the image processing circuit 20, and the memory control circuit 22, are sequentially displayed on the image display unit 28 via the memory control circuit 22 and D/A converter 26, thus implementing an electronic viewfinder function.

If the image display ON/OFF switch 66 is set to be image display=OFF (S113), the system control circuit 50 cancels the image display flag (S117), and sets the image display function of the image display unit 28 to an OFF state (S118). The flow then advances to step S119.

If image display=OFF, shooting is made using the optical viewfinder 104 without using the electronic viewfinder function implemented by the image display unit 28. In this case, the consumption power of the image display unit 28, the D/A converter 26, and the like which consume large electric power can be reduced. Note that the status of the image display flag is stored in the internal memory of the system control circuit 50 or the memory 52.

If the shutter switch SW is OFF (S119), the flow returns to step S103. If the shutter switch SW1 is ON (S119), the system control circuit 50 checks the status of the image display flag stored in the internal memory of the system control circuit 50 or the memory 52 (S120). If the image display flag is set, the circuit 50 sets the display state of the image display unit 28 in a freeze display state (S121), and the flow advances to step S122.

In the freeze display state, image data in the image display memory 24 is inhibited from being rewritten via the image sensing element 14, the A/D converter 16, the image processing circuit 20, and the memory control circuit 22, and image data written last is displayed on the image display unit 28 via the memory control circuit 22 and D/A converter 26, thus displaying a frozen image on the electronic viewfinder.

If the image display flag is canceled (S120), the flow advances to step S122. The system control circuit 50 performs a ranging process for bringing the shooting lens 10 into focus on an object, and also executes a photometry process to determine the aperture value and shutter speed (S122). In the photometry process, the circuit 50 makes flash settings. Details of the process of ranging and photometry (S122) will be described later using FIG. 4.

Upon completion of the process of ranging and photometry (S122), the system control circuit 50 checks the status of the image display flag stored in its internal memory or the memory 52 (S123). If the image display flag is set, the circuit 50 sets the display state of the image display unit 28 in a through display state (S124), and the flow advances to step S125. Note that the through display state in step S124 is the same operation state as the through state in step S116.

If the shutter switch SW2 is not pressed (S125), and the shutter switch SW1 is also canceled (S126), the flow returns to step S103. If the shutter switch SW2 is pressed (S125), the system control circuit 50 checks the status of the image display flag stored in its internal memory or the memory 52 (S127). If the image display flag is set, the circuit 50 sets the display state of the image display unit 28 in a fixed color display state (S128), and the flow advances to step S142.

In the fixed color display state, fixed-color image data is displayed on the image display unit 28 via the memory control circuit 22 and D/A converter 26 in place of shot image data, which is written in the image display memory 24 via the image sensing element 14, the A/D converter 16, the image processing circuit 20, and the memory control circuit 22, thus displaying a fixed-color image on the electronic viewfinder.

If the image display flag is canceled (S127), the flow advances to step S142. The system control circuit 50 acquires the current date from the timepiece 98, and stores it in its internal memory or the memory 52 (S142). Note that the date stored in the internal memory of the system control circuit 50 or the memory 52 is recorded as a shooting date of an image together with that image.

The system control circuit 50 executes a shooting process including an exposure process for writing shot image data in the memory 30 via the image sensing element 14, the A/D converter 16, the image processing circuit 20, and the memory control circuit 22 or directly from the A/D converter via the memory control circuit 22, and a development process for performing various processes by reading out image data written in the memory 30 using the memory control circuit 22 and the image processing circuit 20 as needed (S129). In this case, the circuit 50 adds a date as needed. Details of this shooting process S129 will be described later using FIG. 5.

The system control circuit 50 checks the status of the image display flag stored in its internal memory or the memory 52 (S130). If the image display flag is set, the circuit 50 makes quick review display (S133).

If the image display flag is canceled (S130), the system control circuit 50 checks the status of a quick review flag stored its internal memory or the memory 52 (S131). If the quick review flag is set, the circuit 50 sets the image display function of the image display unit 28 to an ON state (S132) to make quick review display (S133).

If the image display flag is canceled (S130) and the quick review flag is also canceled (S131), the flow jumps to step S134 while keeping the image display unit 28 in an OFF state.

The system control circuit 50 executes various image processes by reading out shot image data written in the memory 30 using the memory control circuit 22 and the image processing circuit 20 as needed, and also an image compression process according to a mode set using the compression/expansion circuit 32, and then executes a recording process for writing image data on the recording medium 200 or 210 (S134). Details of this recording process S134 will be described later using FIG. 6.

If the shutter switch SW2 is ON upon completion of the recording process S134 (S135), the system control circuit 50 checks the status of a continuous-shot flag stored in its internal memory or the memory 52 (S136). If the continuous-shot flag is set, the flow returns to step S129 to make the next shooting.

If the continuous-shot flag is not set (S136), the system control circuit 50 repeats the current process until the shutter switch SW2 is released (S135).

If the shutter switch SW2 is OFF upon completion of the recording process S134, or if the shutter switch SW2 is released after the shutter switch SW2 is kept ON to continue quick review display and a shot image is confirmed (S135), the flow advances to step S138 after an elapse of a predetermined minimum review time (S137).

Note that this minimum review time may use a fixed value, may be arbitrarily set by the user, or may be arbitrarily set or selected by the user within a predetermined range.

If the image display flag is set (S138), the system control circuit 50 sets the display state of the image display unit 28 in a through display state (S139), and the flow advances to step S141.

If the image display flag is canceled (S138), the system control circuit 50 sets the display state of the image display unit 28 to an OFF state (S140), and the flow advances to step S141.

If the shutter switch SW1 is ON (step S141), the flow returns to step S125, and the system control circuit 50 prepares for the next shooting. If the shutter switch SW1 is OFF (S141), the system control circuit 50 ends a series of shooting operations, and the flow returns to step S103.

Figure 4:
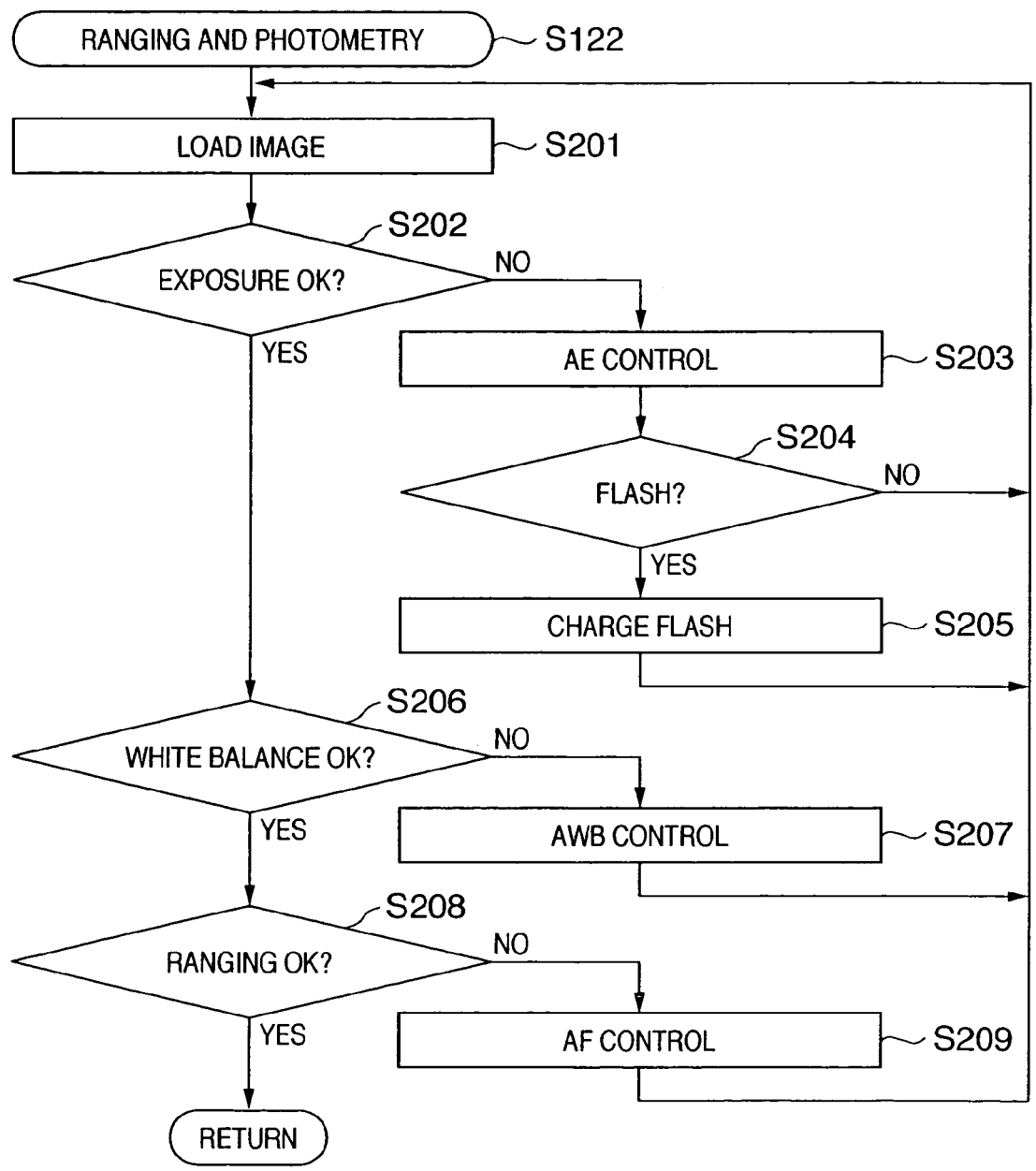
FIG. 4 is a flowchart showing an example of a routine of ranging and photometry in the image processing apparatus 100 according to the embodiment of the present invention.

FIG. 4 is a flowchart showing details of the process of ranging and photometry in step S122 in FIG. 3. The system control circuit 50 reads out a charge signal from the image sensing element 14, and sequentially loads shot image data onto the image processing circuit 20 via the A/D converter 16 (S201). The image processing circuit 20 performs predetermined arithmetic operations used in the TTL (through-the-lens) AE (auto-exposure) process, EF (flash pre-emission) process, and AF (auto-focus) using the sequentially loaded image data.

Note that respective processes in this case extract a required number of specific portions from all shot pixels and uses them in arithmetic operations. In this way, arithmetic operations optimal to each of a center-weighted mode, an average mode, and an evaluation mode can be made in the TTL AE, EF, AWB, and AF processes.

Using the arithmetic results of the image processing circuit 20, the system control circuit 50 performs AE control using the exposure control circuit 40 (S203) until it is determined that an appropriate exposure (AE) value is obtained (S202).

The system control circuit 50 checks using measurement data obtained by the AE control if flash is required (S204). If flash is required, the circuit 50 sets a flash flag and charges the electronic flash 48 (S205).

If it is determined that an appropriate exposure (AE) value is obtained (S202), measurement data and/or setting parameters are stored in the internal memory of the system control circuit 50 or the memory 52. Using the arithmetic results of the image processing circuit 20 and the measurement obtained by the AE control, the system control circuit 50 performs AWB control by adjusting color process parameters using the image processing circuit 20 (S207) until it is determined that appropriate white balance (AWB) is obtained (S206).

If it is determined that appropriate white balance (AWB) is obtained (S206), measurement data and/or setting parameters are stored in the internal memory of the system control circuit 50 or the memory 52. Using the measurement data obtained by the AE control and AWB control, the system control circuit 50 performs AF control using the ranging control circuit 42 (S209) until it is determined that the ranging result indicates an in-focus state (S208).

If it is determined that the ranging result indicates an in-focus state (S208), measurement data and/or setting parameters are stored in the internal memory of the system control circuit 50 or the memory 52, thus ending the routine of ranging and photometry (S122).

Figure 5:
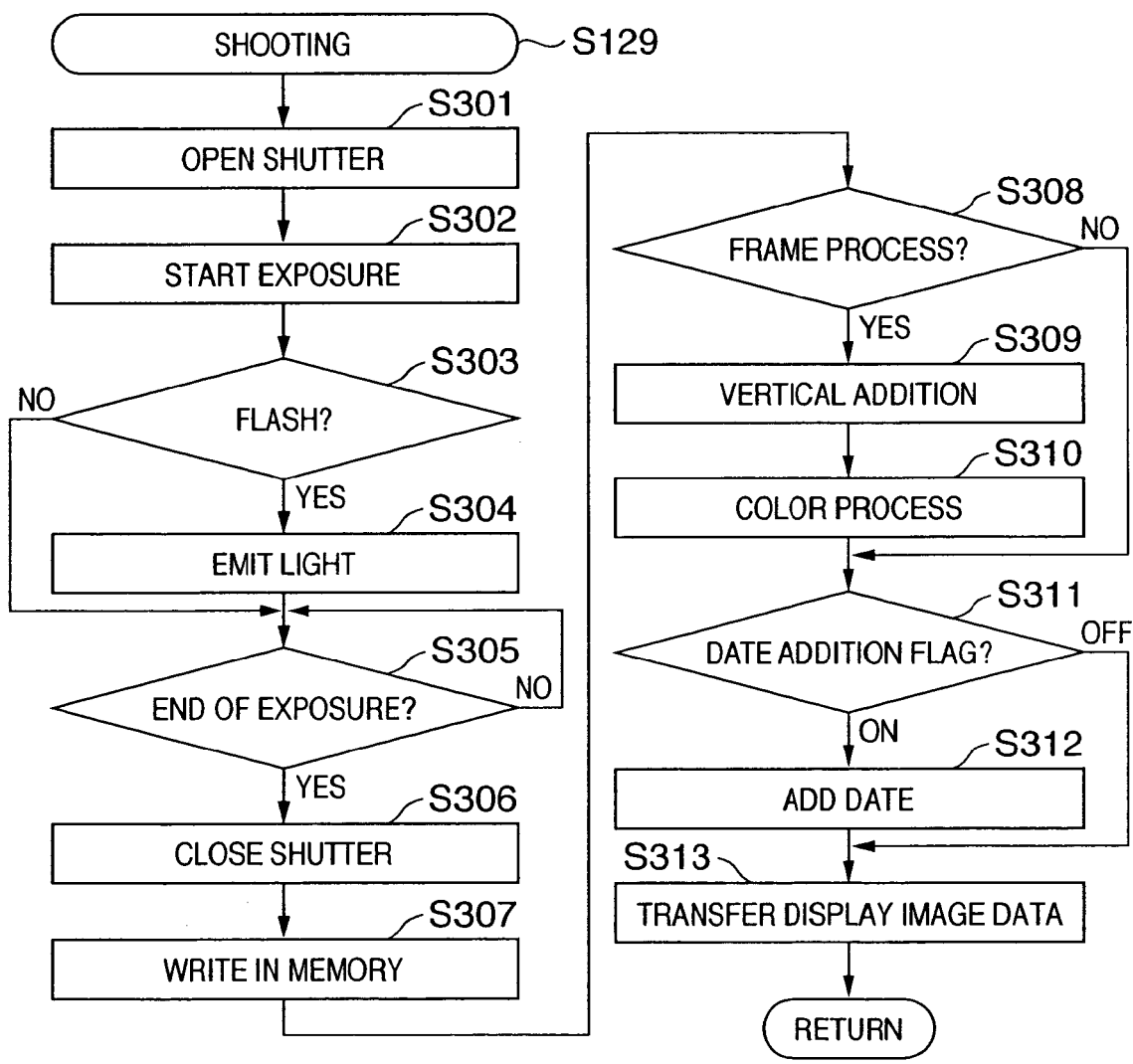
FIG. 5 is a flowchart showing an example of a shooting routine in the image processing apparatus 100 according to the embodiment of the present invention.

FIG. 5 is a flowchart showing details of the shooting process in step S129 in FIG. 3. The system control circuit 50 opens the shutter 12 with the stop function in accordance with the aperture value and exposes the image sensing element 14 using the exposure control circuit 40 in accordance with photometry data stored in its internal memory or the memory 52 (S301, S302).

The system control circuit 50 checks based on the flash flag if the electronic flash 48 is required (S303). If the electronic flash 48 is required, the circuit 50 controls the electronic flash 48 to emit light (S304). The system control circuit 50 waits for the end of exposure of the image sensing element 14 in accordance with the photometry data (S305), closes the shutter 12 (S306), reads out a charge signal from the image sensing element 14, and writes shot image data in the memory 30 via the image sensing element 14, the A/D converter 16, the image processing circuit 20, and the memory control circuit 22 or directly from the A/D converter via the memory control circuit 22 (S307).

If a frame process is required in accordance with the set shooting mode (S308), the system control circuit 50 reads out image data written in the memory 30 and sequentially performs a vertical addition process (S309) and color process (S310) using the memory control circuit 22 and the image processing circuit 20 as needed.

The system control circuit 50 checks the status of the date addition flag stored in its internal memory or the memory 52 (S311). If the date addition flag is canceled ("OFF" in S311), the circuit 50 writes image data in the memory 30.

If the date addition flag is set ("ON" in S311), the system control circuit 50 executes a date addition process by adding the shooting date stored in its internal memory or the memory 52 to image data using the memory control circuit 22 and image processing circuit 20 in step S142 (S312), and writes the date-added image data in the memory 30 after the process.

The system control circuit 50 reads out image data from the memory 30, and transfers display image data to the image display memory 24 via the memory control circuit 22 (S313). Upon completion of a series of processes, the circuit 50 ends the shooting process routine S129.

Figure 6:
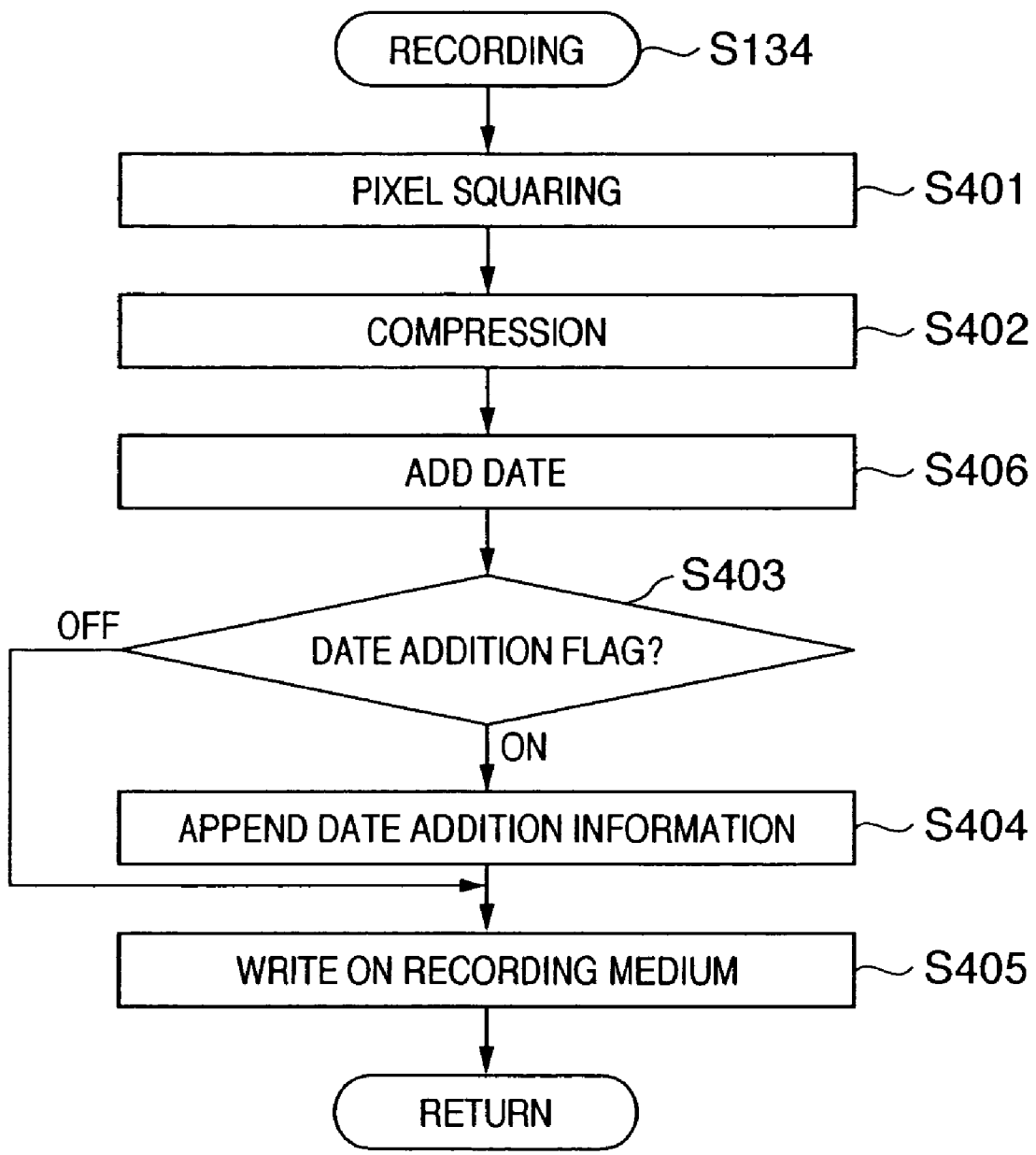
FIG. 6 is a flowchart showing an example of a recording routine in the image processing apparatus 100 according to the embodiment of the present invention.

FIG. 6 is a flowchart showing details of the recording process in step S134 in FIG. 3. The system control circuit 50 reads out shot image data written in the memory 30 using the memory control circuit 22 and the image processing circuit 20 as needed, applies a pixel squaring process that interpolates the aspect ratio of pixels to 1:1 (S401), and then writes the processed image data in the memory 30.

The system control circuit 50 reads out image data written in the memory 30, and performs an image compression process using the compression/expansion circuit 32 in accordance with the set mode (S402). The system control circuit 50 appends the shooting date stored in its internal memory or the memory 52 in step S142 to an image header (S406). The system control circuit 50 checks the status of the date addition flag stored in its internal memory or the memory 52 (S403). If the date addition flag is canceled, the flow jumps to step S405.

If the date addition flag is set ("ON" in S403), the system control circuit 50 appends information associated with date information added to the image (date addition information) to the image header (S404). Details of the date addition information to be appended to this image header will be described later using FIG. 7. Finally, the system control circuit 50 writes the compressed image data on the recording medium 200 or 210 (such as a memory card, a Compact Flash® card, or the like) via the interface 90 or 94 and connector 92 or 96 (S405). Upon completion of the write process on the recording medium, the circuit 50 ends the recording process routine S134.

Figure 7A:
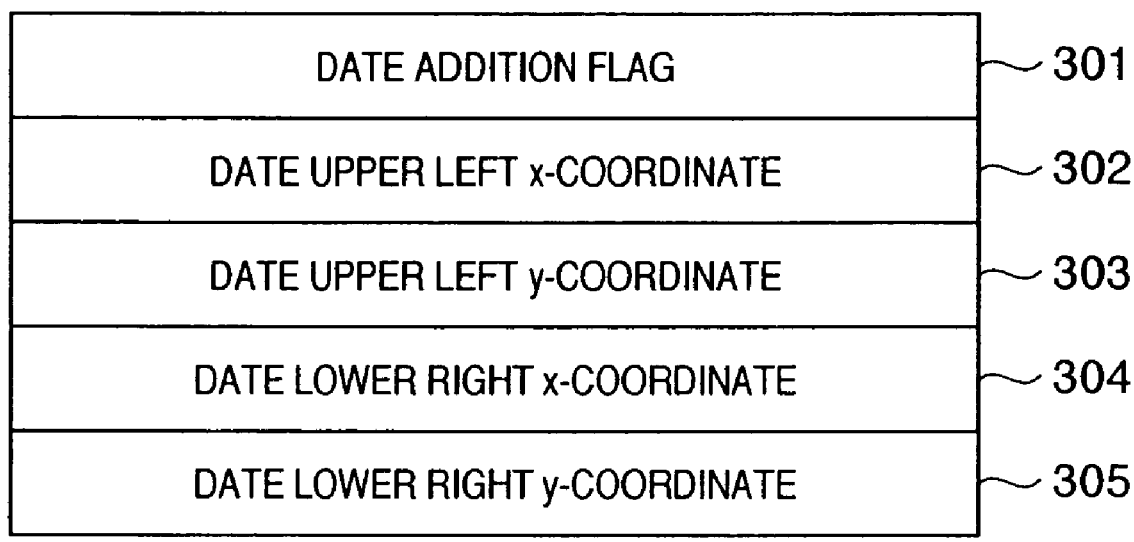
FIG. 7A shows an example of date addition information according to the embodiment of the present invention.

FIG. 7A shows details of the date addition information to be appended to a header of date-added image data in step S404 in FIG. 6. The date addition information is used to identify whether or not date information is added to an image, and includes information indicating if a date is added to an image, and information (position information) indicating the position of a date on an image when the date is added. As the information indicating if a date is added to an image, a date addition flag 301 is used. The date addition flag 301 can assume one of two values (true or false). If the flag 301 is true, it indicates that a date is added to an image. If the flag 301 is false, it indicates that no date is added to an image, and the contents of coordinate information 302 to coordinate information 305 have no meanings.

As the information indicating the position of a date on an image when the date is added, four pieces of information are available as follows. That is, date upper left x-coordinate information 302 indicates the x-coordinate of the upper left corner of a date addition field 306 on an image, and date upper left y-coordinate information 303 indicates the y-coordinate of the upper left corner of the date addition field 306 on an image. Date lower right x-coordinate information 304 indicates the x-coordinate of the lower right corner of the date addition field 306 on an image, and date lower right y-coordinate information 305 indicates the y-coordinate of the lower right corner of the date addition field 306 on an image.

FIG. 7B shows an example of the respective coordinate positions on image data. Note that the x-y coordinate system is set to have a point 307 as an origin, a direction 308 as the x-axis, and a direction 309 as the y-axis.

The operation of the print process of the image processing apparatus 100 according to this embodiment will be described below with reference to FIGS. 8 to 12. The image processing apparatus 100 can print images recorded on the recording media 200 and 210 via the printer apparatus 600 when it is directly connected to the printer apparatus 600 via the connector 112 and communicates with the printer apparatus 600 via the communication circuit 110.

Figure 8:
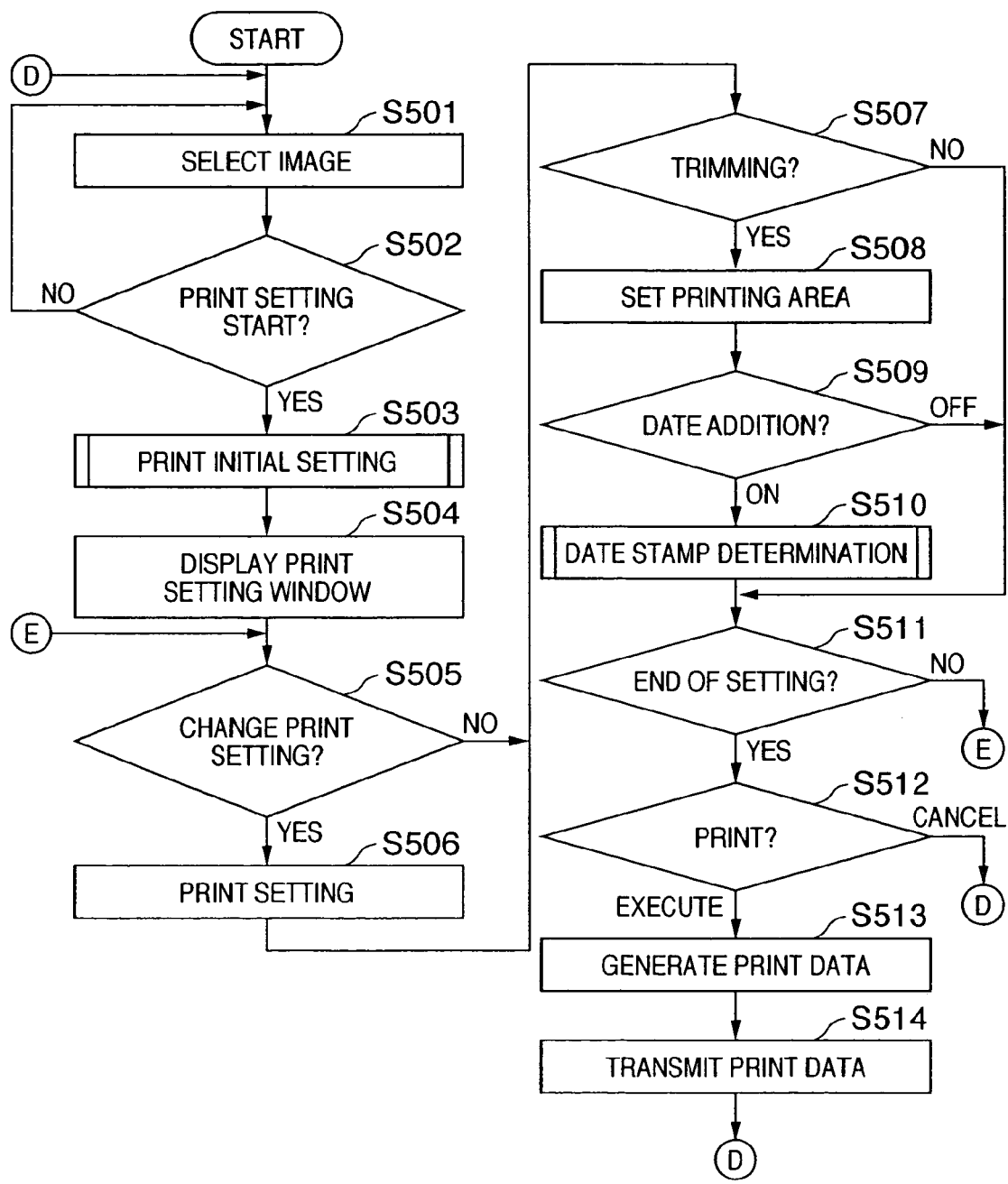
FIG. 8 is a flowchart showing an example of a print operation in the image processing apparatus 100 according to the embodiment of the present invention.

FIG. 8 is a flowchart corresponding to an example of the process on the image processing apparatus 100 side upon printing an image by connecting the image processing apparatus 100 and printer apparatus 600 of this embodiment. When the image processing apparatus 100 is connected to the printer apparatus 600 via a dedicated cable, it starts a communication with the printer apparatus 600 and enters a print mode. In the print mode, images recorded on the recording media 200 and 210 are displayed on the image display unit 28, and the displayed images can be printed.

Based on predetermined user's button operations of the console 70, a select of an image to be printed is received while sequentially displaying images recorded on the recording media 200 and 210 (S501).

Figure 11:
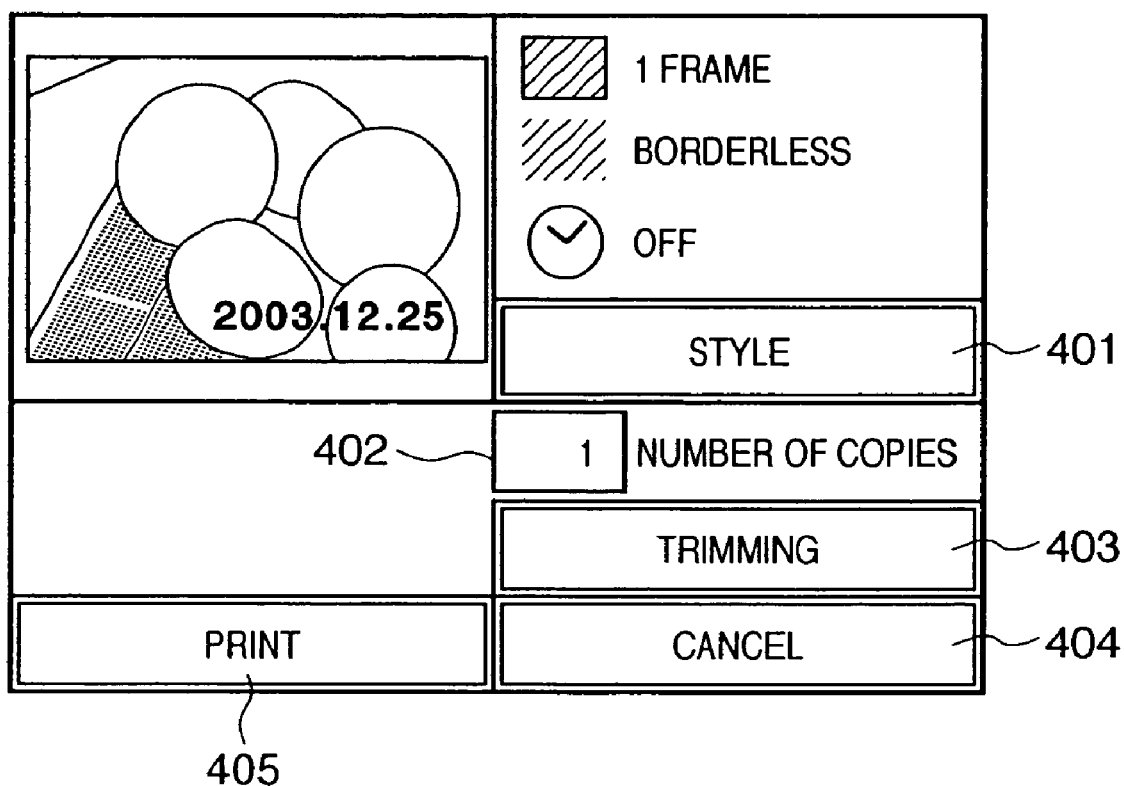
FIG. 11 shows an example of a print setting window in the image processing apparatus 100 according to the embodiment of the present invention.

It is checked if a print setting start operation is received while the image to be printed is displayed (S502). If the print setting start operation is received ("YES" in S502), print initial settings are made (S503), and a print setting window shown in FIG. 11 is displayed on the image display unit 28 (S504).

Figure 9:
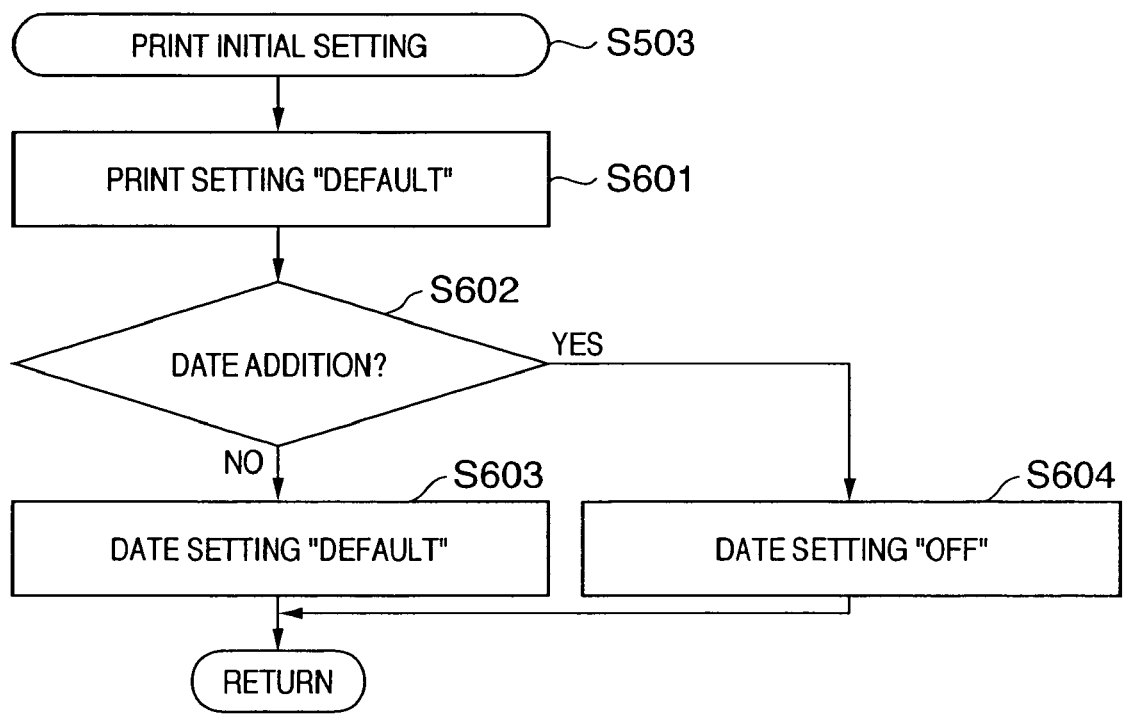
FIG. 9 is a flowchart showing an example of a print initial setting routine in the image processing apparatus 100 according to the embodiment of the present invention.

Details of the print initial settings (S503) will be described below using FIG. 9. In the print initial settings (S503), print settings that set printing conditions of a frame setting, paper setting, border setting, and the like are set as default settings upon printing by reading out setting values in the previous print process stored in the nonvolatile memory 56 upon completion of the previous print process (S601).

It is determined with reference to the date addition information in the header of the displayed image if date information is added to the image (S602). If the date addition flag 301 in the date addition information is "false", since it indicates that no date is added to the image, date information can be prevented from being doubly added even when a process for adding date information is executed according to the settings on the printer 600 side. Hence, the setting values in the previous print process stored as predetermined setting values in the nonvolatile memory 56 are set intact (S603), thus ending the print initial settings (S503).

On the other hand, if the date addition flag 301 is true, since it indicates that the date is added to the image, date information is doubly printed if the printer apparatus 600 executes a process for adding date information. Hence, the date setting of the current print is set to be "OFF" (S604) independently of whether the setting value in the previous print process stored in the nonvolatile memory 56 is "ON" or "OFF" (S604), thus ending the print initial settings (S503).

As described above, according to the present invention, when it is determined with reference to the date addition information recorded in the image header upon execution of the print process that the data is added to the image, the date stamp setting as the printing condition on the printer apparatus 600 is set to be "OFF", thus inhibiting the date information addition process on the printer apparatus 600 and preventing from doubly printing the date added to the image and the date to be appended by the printer apparatus 600.

Upon completion of the print initial settings (S503), the print setting window shown in FIG. 11 is displayed on the image display unit 28 (S504). In this display state, it is checked if the print settings are to be changed (S505). More specifically, it is checked if choices of a style box 401 and number-of-copies setting box 402 on the print setting window in FIG. 11 are received. If it is determined as result of this checking that the choice of, e.g., the style button 401 is received ("YES" in S505), a setting change window including a frame setting, paper setting, border setting, and the like is displayed independently of the window shown in FIG. 11, and a change in setting value is received upon operation of the console 70 (S506). If the number-of-copies setting box 402 is selected by the console 70 ("YES" in S505), a change in the number of copies to be printed is received (S506). Upon completion of the print settings in step S506, the flow advances to step S507. On the other hand, if neither the button 401 nor button 402 is selected by the console 70, the flow jumps to step S507.

Figure 12:
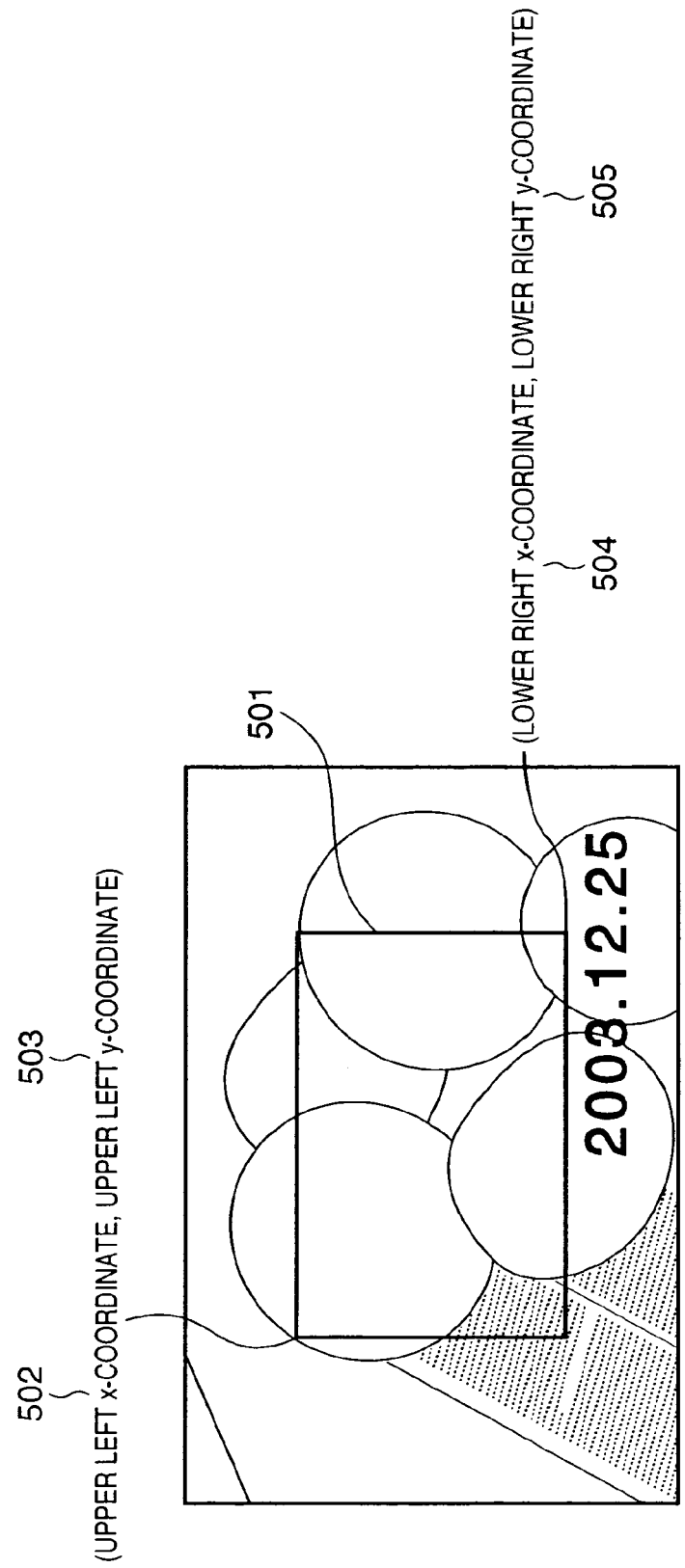
FIG. 12 is a view for explaining an image trimming process according to the embodiment of the present invention.

It is checked in step S507 if the image is to undergo trimming. Note that trimming is a process for setting a printing area. Normally, the entire image is to be printed. However, when the user wants to print only a partial area of the image, he or she can set that area as a printing area by trimming. More specifically, it is checked if a trimming button 403 on the print setting window in FIG. 11 is selected by the console 70. If the trimming button 403 is selected ("YES" in S507), a trimming setting window is displayed, and a trimming frame 501 is superimposed on the selected image, as shown in FIG. 12. Movement and a change in size of this trimming frame 501 can be received via the console 70, and the printing area is set (S508). The set printing area is determined as an upper left x-coordinate 502, an upper left y-coordinate 503, a lower right x-coordinate 504, and a lower right y-coordinate 505 of the trimming frame 501 with respect to image data.

If the trimming button 403 is not selected, the flow jumps to step S511 to check if the settings are to end.

After completion of the setting of the printing area in step S508, it is checked with reference to the date addition information in the header of the image displayed on the image display unit 28 if date information is included in the image information (S509). If the date addition flag 301 in the date addition information is false, since it indicates that no date is added to the image, the flow jumps to step S511.

On the other hand, if the date addition flag 301 is true, it indicates that the date is added to the image. In this case, since the date-added portion may be deleted by trimming, it is checked if the printer apparatus 600 must execute a date addition process, and the date setting is redone (S510).

Figure 10:
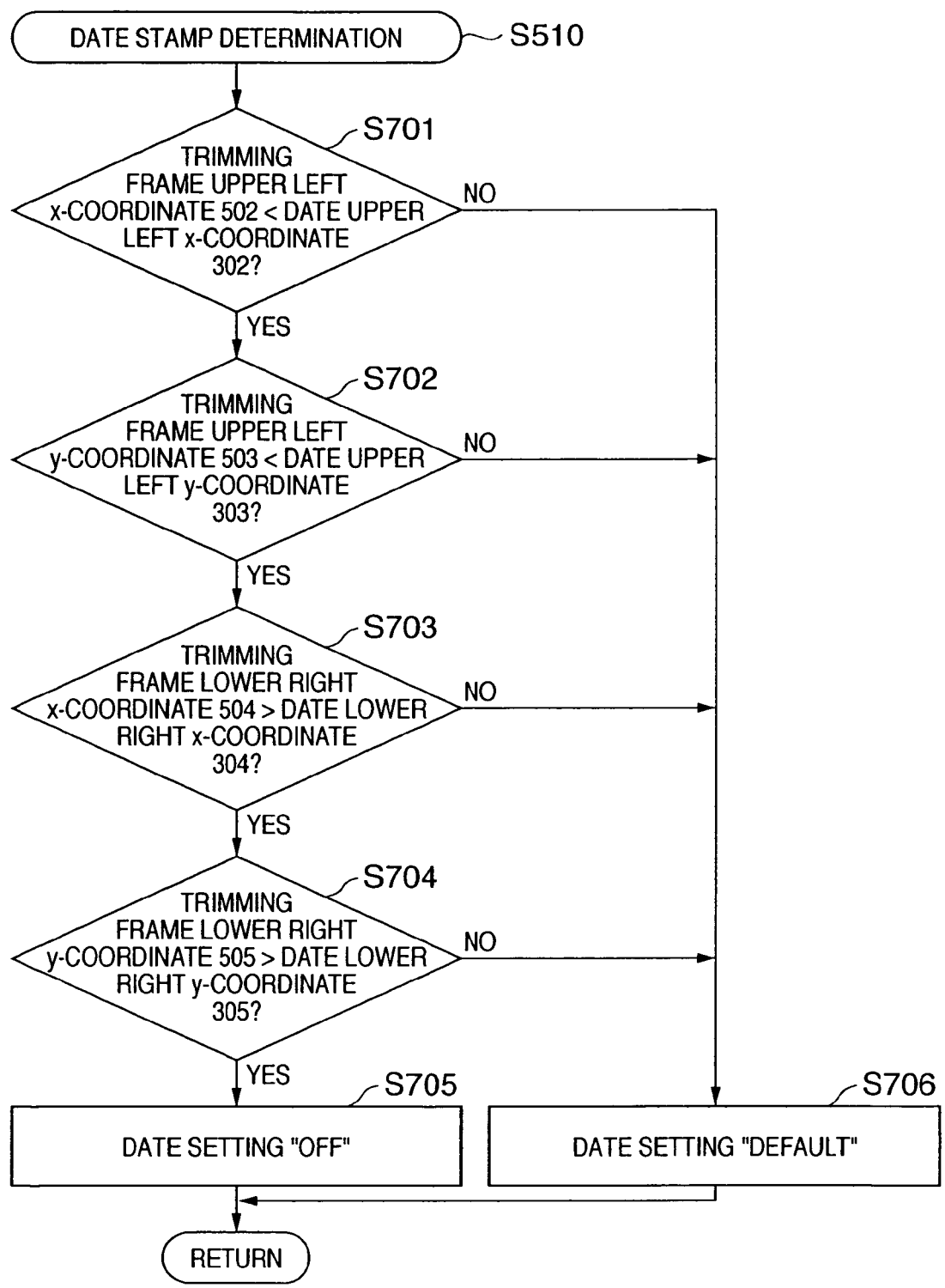
FIG. 10 is a flowchart showing an example of a date stamp determination routine in the image processing apparatus 100 according to the embodiment of the present invention.

Details of the date stamp determination process (S510) will be explained below using FIG. 10. In the date stamp determination process, it is checked on the basis of the information indicating the date position on the image in the date addition information appended to the image header, and the position information of the trimming frame if the date is added within the printing area.

More specifically, the upper left x-coordinate 502 of the trimming frame 501 is compared with the upper left x-coordinate 302 of the date addition field 306 (S701). If the upper left x-coordinate 502 of the trimming frame 501 is larger than the upper left x-coordinate 302 of the date addition field ("NO" in S701), it is determined that no date is added within the printing area, and the flow advances to step S706.

If the upper left x-coordinate 502 of the trimming frame 501 is smaller than the upper left x-coordinate 302 of the date addition field ("YES" in S701), the upper left y-coordinate 503 of the trimming frame 501 is compared with the upper left y-coordinate 303 of the date addition field (S702). If the upper left y-coordinate 503 of the trimming frame 501 is larger than the upper left y-coordinate 303 of the date addition field ("NO" in S702), it is determined that no date is added within the printing area, and the flow advances to step S706.

If the upper left y-coordinate 503 of the trimming frame 501 is smaller than the upper left y-coordinate 303 of the date addition field ("YES" in S702), the lower right x-coordinate 504 of the trimming frame 501 is compared with the lower right x-coordinate 304 of the date addition field (S703). If the lower right x-coordinate 504 of the trimming frame 501 is smaller than the lower right x-coordinate 304 of the date addition field ("NO" in S703), it is determined that no date is added within the printing area, and the flow advances to step S706.

If the lower right x-coordinate 504 of the trimming frame 501 is larger than the lower right x-coordinate 304 of the date addition field ("NO" in S703), the lower right y-coordinate 505 of the trimming frame 501 is compared with the lower right y-coordinate 305 of the date addition field (S704). If the lower right y-coordinate 505 of the trimming frame 501 is smaller than the lower right y-coordinate 305 of the date addition field ("NO" in S704), it is determined that no date is added within the printing area, and the flow advances to step S706.

If the lower right y-coordinate 505 of the trimming frame 501 is larger than the lower right y-coordinate 305 of the date addition field ("YES" in S704), it is determined that the date is added within the printing area, and the date setting which is set to be "OFF" in step S604 is left unchanged ("OFF") (S705), thus ending the date stamp determination process (S510).

On the other hand, if it is determined that no date is added within the printing area after trimming, the date setting which is set to be "OFF" in step S604 is re-set to a predetermined setting value (default setting value) in the previous print process, which is stored in the nonvolatile memory 56 (S706), thus ending the date stamp determination process (S510).

As described above, according to the present invention, if it is determined with reference to the date addition information recorded in the image header upon execution of the trimming print process that the date is added within the printing area, the date stamp setting is set to be "OFF", thus inhibiting addition of date information in the printer apparatus 600 even in the trimmed image, and preventing double printing of the date added to the image and the date to be appended by the printer apparatus 600. On the other hand, if the date information added to the image is deleted by trimming, the date setting is returned to a default setting value, and the printer apparatus 600 can add date information as needed upon printing. Hence, even when trimming is made, date information can be reliably appended while preventing printing of two dates.

Upon completion of all the print settings, it is checked if the settings are to end (S511). If the print settings are to be redone ("NO" in S511), the flow returns to step S505 to receive a change in setting.

It is checked in step S512 if a print process is to be executed. It is checked if a print button 405 on the print setting window in FIG. 11 is selected by the console 70. If the print button 405 is selected ("execute" in S512), the print data to be transmitted to the printer apparatus 600, which is connected to the image processing apparatus 100 via the dedicated cable, is generated (S513).

On the other hand, if a cancel button 404 on the print setting window in FIG. 11 is selected by the console 70 ("cancel" in S512), the flow returns to step S501 to receive image selection.

Upon completion of generation of the print data in step S513, the generated print data is transmitted to the printer apparatus 600 (S514). This print data is transmitted to the printer apparatus 600 as a job which includes the print settings as printing conditions received by the image processing apparatus 100 in addition to image data to be printed. Upon reception of the job transmitted from the image processing apparatus 100, the printer apparatus 600 executes the print process, and the image processing apparatus 100 receives the next image selection after the flow returns to step S501.

In this embodiment, when the image processing apparatus 100 and printer apparatus 600 are directly connected via the connector 112, and communicate with each other via the communication circuit 110, images recorded on the recording media 200 and 210 are printed via the printer apparatus 600. However, the arrangement of the present invention is not limited to the image processing apparatus 100 and printer apparatus 600 which are independently arranged. For example, the printer apparatus 600 may be integrated with the image processing apparatus 100, and the system control circuit 50 may also control the printer apparatus.

In this case, in the flowchart shown in FIG. 8, the print data transmission process in step S514 is replaced by a print process, and the print process is executed in accordance with the print settings and date setting set in the previous steps. Hence, if the date setting is "OFF", the printer apparatus 600 does not add any date information. If the date setting is "default", whether or not date information is to be added is controlled in accordance with predetermined (e.g., previous) settings.

Furthermore, by providing a print function to the image processing apparatus 100 in place of the image sensing function, the printer apparatus which can prevent double printing of the date added to the image and the date to be appended by the print function can be implemented.

In this case, the printer apparatus 600 can execute the process shown in FIG. 8 for an image acquired by the image acquisition device 606. That is, for an image whose header is appended with the date addition information, whether or not date information is added to the image is determined based on the contents of the date addition information. If it is determined that the date information has already been added to the image, addition of date information on the printer apparatus 600 side is inhibited. If it is determined that no date information is added to the image, whether or not a date information addition process is to be done is determined in accordance with the default settings of the printer apparatus 600.

As described above, according to the present invention, date information can be prevented from being doubly printed upon printing a shot image.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (a DVD-ROM, a DVD-R a DVD+RW and a DVD-RW).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

The invention claimed is:

1. A digital camera connectable to a printer apparatus and that can control the connected printer apparatus to print a shot image, comprising:
   an image sensing unit that shoots an image;
   a setting reception unit that receives settings as to whether or not date information of the shooting is to be added to the image shot by said image sensing unit;
   a composition unit that adds the date information to the image shot by said image sensing unit based on the received settings;
   a storing unit that stores in a storage medium the shot image whose header has appended thereto an identifier used to identify whether or not the date information is added to the shot image;
   a display unit that displays the shot image stored in the storage medium;
   a selection unit that selects an image to be printed among the images stored in the storage medium;
   a control unit that controls the display unit to display a print setting screen for setting a printing condition for the selected image to be printed, wherein a setting of the printing condition in a previous print process is displayed as a default setting of the printing condition;
   a setting unit that sets a setting value of the printing condition according to a user operation using the print setting screen, wherein the setting value is the same as the default setting or altered from the default setting;
   a transmission unit that transmits the printing condition having the setting value set by said setting unit and the image to be printed to the printer apparatus; and
   a first determination unit that determines whether the date information is added to the image to be printed based on the identifier of the image to be printed,
   wherein the control unit controls the display unit to display a date-stamp-off setting as the default setting instead of the setting of the previous print process, when the first determination unit determines that the date information has already been added to the image to be printed, and
   said setting unit can alter the setting value from the date-stamp-off setting as the default setting to a date-stamp-on setting value even if the date information has already been added to the image to be printed.

2. The digital camera according to claim 1, further comprising:
   a trimming setting unit that sets a partial area of the image to be printed as a printing area, when a trimming setting is selected in the print setting screen; and
   a second determination unit that determines whether or not the date information is included in the printing area based on the partial area set by the trimming setting unit and position information specifying a position in the image where the date information is added, wherein the identifier includes the position information, wherein when the trimming setting unit sets the partial area as the printing area at the date-stamp off setting, the control unit changes the default setting from the date-stamp-off setting to the setting in the previous print process, if said second determination unit determines that the date information is not included in the printing area, and the control unit keeps the default setting as the date-stamp-off setting, if said second determination unit determines that the date information is included in the printing area.

3. An image processing apparatus comprising:
   a read out unit that reads out an image from a storage medium which stores the image with an identifier used to identify whether date information of shooting is added to the image;
   a display unit that displays the image read out from the storage medium;
   a selection unit that selects an image to be printed among the images stored in the storage medium;
   a control unit that controls the display unit to display a print setting screen for setting a printing condition for the selected image to be printed, wherein a setting of the printing condition in a previous print process is displayed as a default setting of the printing condition;

a setting unit that sets a setting value of the printing condition according to a user operation using the print setting screen, wherein the setting value is the same as the default setting or altered from the default setting;

an image processing unit that executes a print process to print the image to be printed based on the printing condition having the setting value set by said setting unit; and a first determination unit that determines whether the date information is added to the image to be printed based on the identifier of the image to be printed, wherein the control unit controls the display unit to display a date-stamp-off setting as the default setting instead of the setting in the previous print process, when the first determination unit determines that the date information has already been added to the image to be printed, and said setting unit can alter the setting value from the date-stamp-off setting as the default setting to a date-stamp-on setting value even if the date information has already been added to the image to be printed.

4. The image processing apparatus according to claim 3, further comprising:

a trimming setting unit that sets a partial area of the image to be printed as a printing area, when a trimming setting is selected in the print setting screen; and a second determination unit that determines whether or not the date information is included in the printing area based on the partial area set by the trimming setting unit and position information specifying a position in the image where the date information is added, wherein the identifier includes the position information, wherein when the trimming setting unit sets the partial area as the printing area at the date-stamp off setting, the control unit changes the default setting from the date-stamp-off setting to the setting in the previous print process, if the second determination unit determines that the date information is not included in the printing area, when the trimming setting unit sets the partial area as the printing area at the date-stamp off settings.

5. A method of controlling a digital camera connectable to a printer apparatus and controlling the connected printer apparatus to print a shot image, said method comprising:

an image sensing step of shooting an image;

a setting reception step of receiving settings as to whether or not date information of the shooting is to be added to the image shot in said image sensing step;

a composition step of adding the date information to the image shot in said image sensing step based on the received settings;

a storing step of storing in a storage medium the shot image whose header has appended thereto an identifier used to identify whether or not the date information is added to the shot image;

a display step of displaying the shot image stored in the storage medium on a display unit;

a selection step of selecting an image to be printed among the images stored in the storage medium;

a control step of controlling the display unit to display a print setting screen for setting a printing condition for the selected image to be printed, wherein a setting of the printing condition in a previous print process is displayed as a default setting of the printing condition;

a setting step of setting a setting value of the printing condition according to a user operation using the print setting screen, wherein the setting value is the same as the default setting or altered from the default setting;

a transmission step of transmitting the printing condition having the setting value set in said setting step and the image to be printed to the printer apparatus; and a first determination step of determining whether the date information is added to the image to be printed based on the identifier of the image to be printed, wherein in the control step, the display unit is controlled to display a date-stamp-off setting as the default setting instead of the setting in the previous print process, when it is determined that the date information has already been added to the image to be printed in the first determination step, and in said setting step, the setting value can be altered from the date-stamp-off setting as the default setting to a date-stamp-on setting value even if the date information has already been added to the image to be printed.

6. A method of controlling an image processing apparatus comprising:

a read out step of reading out an image from a storage medium which stores an image to which is attached an identifier used to identify whether or not the date information of shooting the image is added to the image;

a display step of displaying the image read out from the storage medium on a display unit;

a selection step of selecting an image to be printed among the images stored in the storage medium;

a control step of controlling the display unit to display a print setting screen for setting a printing condition for the selected image to be printed, wherein a setting of the printing condition in a previous print process is displayed as a default setting of the printing condition;

a setting step of setting a setting value of the printing condition according to an user operation using the print setting screen, wherein the setting value is the same as the default setting or altered from the default setting;

an image processing step of executing a print process to print the image to be printed based on the printing condition having the setting value set in said setting step; and a first determination step of determining whether the date information is added to the image to be printed based on the identifier of the image to be printed, wherein in the control step, the display unit is controlled to display a date-stamp-off setting as the default setting instead of the setting in the previous print process, when it is determined that the date information has already been added to the image to be printed in the first determination step, and in said setting step, the setting value can be altered from the date-stamp-off setting as the default setting to a date-stamp-on setting value even if the date information has already been added to the image to be printed.

7. A computer readable storage medium storing a computer program that causes a computer to execute a method of controlling a digital camera connectable to a printer apparatus and controlling the connected the printer apparatus to print a shot image, the method comprising:

an image sensing step of shooting an image;

a setting reception step of receiving settings as to whether or not date information of the shooting is to be added to the image shot in said image sensing step;

a composition step of adding the date information to the image shot in said image sensing step based on the received settings;

a storing step of storing in a storage medium the shot image whose header has appended thereto an identifier, which is used to identify whether or not the date information is added to the shot image;

a display step of displaying the shot image stored in the storage medium on a display unit;

a selection step of selecting an image to be printed among the images stored in the storage medium;

a control step of controlling the display unit to display a print setting screen for setting a printing condition for the selected image to be printed, wherein a setting of the printing condition in a previous print process is displayed as a default setting of the printing condition;

a setting step of setting a setting value of the printing condition according to a user operation using the print setting screen, wherein the setting value is the same as the default setting or altered from the default setting;

a transmission step of transmitting the printing condition having the setting value set in said setting step and the image to be printed to the printer apparatus; and a first determination step of determining whether the date information is added to the image to be printed based on the identifier of the image to be printed, wherein in the control step, the display unit is controlled to display a date-stamp-off setting as the default setting instead of the setting in the previous print process, when it is determined that the date information has already been added to the image to be printed in the first determination step, and in said setting step, the setting value can be altered from the date-stamp-off setting as the default setting to a date-stamp-on setting value even if the date information has already been added to the image to be printed.

8. A computer readable storage medium storing a computer program that causes a computer to execute a method of controlling an image processing apparatus, the method comprising:

a read out step of reading out an image from a storage medium which stores an image to which is attached an identifier used to identify whether or not the date information of shooting the image is added to the image;

a display step of displaying the image read out from the storage medium on a display unit;

a selection step of selecting an image to be printed among the images stored in the storage medium;

a control step of controlling the display unit to display a print setting screen for setting a printing condition for the selected image to be printed, wherein a setting of the printing condition in a previous print process is displayed as a default setting of the printing condition;

a setting step of setting a setting value of the printing condition according to a user operation using the print setting screen, wherein the setting value is the same as the default setting or altered from the default setting;

an image processing step of executing a print process to print the image to be printed based on the printing condition having the setting value set in said setting step; and a first determination step of determining whether the date information is added to the image to be printed based on the identifier of the image to be printed, wherein in the control step, the display unit is controlled to display a date-stamp-off setting as the default setting instead of the setting in the previous print process, when it is determined that the date information has already been added to the image to be printed in the first determination step, and in said setting step, the setting value can be altered from the date-stamp-off setting as the default setting to a date-stamp-on setting value even if the date information has already been added to the image to be printed.

* * * * *